(12) United States Patent
Long et al.

(10) Patent No.: US 12,407,499 B2
(45) Date of Patent: Sep. 2, 2025

(54) SECURE RELAY-BASED QUANTUM COMMUNICATION METHOD AND COMMUNICATION NETWORK

(71) Applicant: TSINGHUA UNIVERSITY, Beijing (CN)

(72) Inventors: Guilu Long, Beijing (CN); Dong Pan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 193 days.

(21) Appl. No.: 18/259,072

(22) PCT Filed: Jul. 28, 2021

(86) PCT No.: PCT/CN2021/108903
§ 371 (c)(1),
(2) Date: Jun. 22, 2023

(87) PCT Pub. No.: WO2022/142307
PCT Pub. Date: Jul. 7, 2022

(65) Prior Publication Data
US 2024/0048371 A1    Feb. 8, 2024

(30) Foreign Application Priority Data

Dec. 31, 2020 (CN) .......................... 202011629573.2

(51) Int. Cl.
*H04L 9/08* (2006.01)
*H04B 10/079* (2013.01)
(Continued)

(52) U.S. Cl.
CPC ..... *H04L 9/0855* (2013.01); *H04B 10/07953* (2013.01); *H04B 10/29* (2013.01); *H04L 9/0618* (2013.01); *H04L 9/0858* (2013.01)

(58) Field of Classification Search
CPC ... H04L 9/0852; H04L 9/0855; H04L 9/0618; H04L 9/0858; H04L 63/0428;
(Continued)

(56) References Cited

U.S. PATENT DOCUMENTS

| 8,428,457 B2* | 4/2013 | Mizutani | ............ H04Q 11/0067 398/43 |
| 10,630,469 B2* | 4/2020 | Ahn | .......................... H04L 9/14 |

(Continued)

FOREIGN PATENT DOCUMENTS

| CN | 101394269 A | 3/2009 |
| CN | 102238005 A | 11/2011 |

(Continued)

OTHER PUBLICATIONS

Yin et al.; "Research of Long-distance Encrypted Signal Transmission Enhancement Method based on Quantum Communication Power System", 2018, IEEE, pp. 403-405. (Year: 2018).*

(Continued)

*Primary Examiner* — Matthew Smithers
(74) *Attorney, Agent, or Firm* — Womble Bond Dickinson (US) LLP (57) ABSTRACT

The present application provides a secure repeater-based quantum communication method and communication network. Said method comprises a transmitter encrypting plaintext information to be sent, to obtain ciphertext; the transmitter sending the ciphertext to a repeater node by means of a quantum communication protocol, so as to send the ciphertext to a receiver by means of at least one repeater node; and after receiving the ciphertext, the receiver decrypting the ciphertext to obtain the plaintext information. The ciphertext is transmitted step by step by means of the at least one repeater node, which is not limited to the distance between the transmitter and the receiver, so that the cipher- (Continued)

text can be transmitted over a long distance. Furthermore, before arriving at the receiver, the plaintext information is transmitted in the form of a ciphertext and is decrypted on the fly, thereby reducing the risk of information being eavesdropped, improving the security.

9 Claims, 2 Drawing Sheets

(51) Int. Cl.
*H04B 10/29* (2013.01)
*H04L 9/06* (2006.01)
(58) Field of Classification Search
CPC .. H04B 10/70; H04B 10/29; H04B 10/07953; H04W 12/63
See application file for complete search history.

(56) References Cited

U.S. PATENT DOCUMENTS

| | | | |
|---|---|---|---|
| 2006/0002563 | A1* | 1/2006 | Bussieres .............. H04L 9/0852 380/278 |
| 2010/0226659 | A1 | 9/2010 | Nishioka et al. |
| 2013/0251145 | A1* | 9/2013 | Lowans ................ H04L 9/0891 380/44 |
| 2016/0218867 | A1* | 7/2016 | Nordholt ............... H04L 9/0852 |
| 2016/0248581 | A1* | 8/2016 | Fu ........................... H04L 45/00 |
| 2017/0214525 | A1* | 7/2017 | Zhao ................. H04W 12/0431 |
| 2017/0346627 | A1* | 11/2017 | Alleaume ............. H04L 9/0858 |
| 2019/0260581 | A1* | 8/2019 | Su ............................. H04L 9/08 |
| 2020/0274701 | A1* | 8/2020 | Yuan ..................... H04L 9/0841 |
| 2021/0044433 | A1* | 2/2021 | Hay ...................... H04L 9/0855 |
| 2023/0020193 | A1* | 1/2023 | Williams .............. H04L 9/0825 |

FOREIGN PATENT DOCUMENTS

| | | | |
|---|---|---|---|
| CN | 106130725 | A | 11/2016 |
| CN | 107872311 | A | 4/2018 |
| CN | 108847932 | A | 11/2018 |
| CN | 109617687 | A | 4/2019 |
| CN | 112787807 | A | 5/2021 |

OTHER PUBLICATIONS

Bratzik et al.; "Quantum repeaters and quantum key distribution: The impact of entanglement distillation on the secret key rate." 2013, Physical Review A 87, 062335, pp. 1-11. (Year: 2013).*

Long et al.; "Quantum secure direct communication and deterministic secure quantum communication", 2007, Front. Phys. China, 2007, 2(3): pp. 251-272 (Year: 2007).*
Isailovic et al.; "Datapath and Control for Quantum Wires", Mar. 2004, ACM Transactions on Architecture and Code Optimization, vol. 1, No. 1, pp. 34-61. (Year: 2004).*
W. Dür et al.; "Quantum repeaters based on entanglement purification", Jan. 1999, Physical Review A, vol. 59, pp. 169-181. (Year: 1999).*
Tang et al.; "Programmable Quantum Networked Microgrids", Sep. 2020, IEEE Transactions on Quantum Engineering, vol. 1, pp. 1-13. (Year: 2020).*
Zhang et al.; "Design and Analysis of Secure Quantum Network System with Trusted Repeaters", 2018, IEEE/CIC International Conference on Communications in China (ICCC), pp. 511-514. (Year: 2018).*
Tysowski et al.; "The engineering of a scalable multi-site communications system utilizing quantum key distribution (QKD)", 2018, Quantum Science Technology, pp. 1-23. (Year: 2018).*
Ciurana et al.; "Quantum metropolitan optical network based on wavelength division multiplexing", 2014, Optical Society of America, pp. 1-18. (Year: 2014).*
Salvali et al.; "Security of Trusted Repeater Quantum Key Distribution Networks", 2009, arXiv. pp. 1-29. (Year: 2009).*
Collins et al.; "Quantum relays for long distance quantum cryptography", 2005, Quantum relays for long distance quantum cryptography, Journal of Modern Optics, vol. 52, No. 5, 20, pp. 735-753. (Year: 2005).*
Briegel et al.; "Quantum Repeaters: The Role of Imperfect Local Operations in Quantum Communication", 1998, Physical Review Letters, vol. 81, No. 26, pp. 5932-5935. (Year: 1998).*
International Search Report issued in connection with PCT/CN2021/108903 (with English translation).
Written Opinion issued in connection with PCT/CN2021/108903.
Official action with search report dated Aug. 26, 2021 issued in Chinese Application No. 202011629573.2.
Qu, Chengyi et al "Design and Implementation of Data Encryption in Computer Networks" Computer Engineering and Design, No. 3, Jun. 29, 1988 (Jun. 29, 1988), ISSN: 1000-7024, Full text, sections 1 to 4.
Long, Guilu "Quantum Secure Direct Communication: Principles and Progress", Information and Communications Technology and Policy, No. 7, Jul. 15, 2020 (Jul. 15, 2020) abstract, Full text, sections 1 to 6.
Qi, Ruoyang et al "Implementation and security analysis of practical quantum secure direct communication", Light: Science & Applications (2019) 8:22.

* cited by examiner

SECURE RELAY-BASED QUANTUM COMMUNICATION METHOD AND COMMUNICATION NETWORK

CROSS-REFERENCE TO RELATED APPLICATION

The present application claims priority to Chinese patent application No. 202011629573.2 filed on Dec. 31, 2020, entitled "Secure Relay-based Quantum Communication Method and Communication Network", which is hereby incorporated by reference in its entirety.

FIELD

The present application relates to the field of quantum communication, and in particular, to a secure repeater based quantum communication method and communication network.

BACKGROUND

Widespread international attention has been paid to quantum communication, as a cross product of quantum physics and cryptography due to its ability to detect eavesdropping, which makes the communication process highly secure. Research on quantum communication mainly focuses on three popular directions: (1) quantum secure direct communication (QSDC); (2) quantum key distribution (QKD); and (3) quantum secret sharing (QSS). QKD and QSS can complete key agreement and key sharing between two legitimate users based on a principle of quantum mechanics, and the key will be used for subsequent classical communication to complete a transmission of private information. QSDC is a communication mode where confidential information is directly transmitted in quantum channels.

The theory of secure communication based on quantum key distribution was proposed earlier and has developed to be mature. With the development of technology, point-to-point quantum key distributions at levels of 400 kilometers on the ground and 1000 kilometers between a satellite and the ground have been achieved. However, quantum communication between two distant points cannot be achieved due to limitation to line losses, which results in that the quantum communication cannot be promoted on a large scale.

SUMMARY

The present application provides a secure repeater based quantum communication method and communication network, which solves the defection of quantum communication being unable to be promoted on a large scale since quantum communication between two distant points cannot be achieved due to limitation to line losses. By the present application, a long-distance quantum communication can be achieved to make the quantum communication be promoted on a large scale.

The present application provides a secure repeater based quantum communication method, applied to a communication network including a transmitter, at least one repeater node and a receiver, the secure repeater based quantum communication method includes:
encrypting, by the transmitter, plaintext information to be transmitted to obtain a ciphertext;
transmitting, by the transmitter, the ciphertext to a repeater node of the at least one repeater node through a quantum communication protocol and transmitting, by the repeater node, the ciphertext to the receiver; and
receiving and decrypting, by the receiver, the ciphertext to obtain the plaintext information;
where a distance between the transmitter and the repeater node for transmitting the ciphertext, a distance between two repeater nodes of the at least one repeater node for transmitting the ciphertext, and a distance between the repeater node for transmitting the ciphertext and the receiver are less than or equal to a maximum communication distance of quantum communication.

According to the secure repeater based quantum communication method provided by the present application, on the basis of the above, the transmitting, by the transmitter, the ciphertext to the repeater node of the at least one repeater node through the quantum communication protocol and transmitting, by the repeater node, the ciphertext to the receiver includes:
performing multiple rounds of encoded ciphertext transmission operation until the ciphertext is transmitted to the receiver;
where the encoded ciphertext transmission operation includes:
in case of performing a first round of encoded ciphertext transmission operation, encrypting, by the transmitter, the ciphertext using a key in a local first key pool to obtain a first encoded ciphertext, encoding, by the transmitter, the first encoded ciphertext to single photons and transmitting, by the transmitter, the single photons to a first repeater node connected to the transmitter, and decrypting, by the first repeater node, the first encoded ciphertext to obtain the ciphertext; or
in case of performing a non-first round of encoded ciphertext transmission operation, encrypting, by a current repeater node which obtains the ciphertext through decryption, the ciphertext using a key in a local second key pool to obtain a second encoded ciphertext, encoding, by the current repeater node, the second encoded ciphertext to single photons and transmitting, by the current repeater node, the single photons to a next repeater node or the receiver connected to the current repeater node, and decrypting, by the next repeater node or the receiver, the second encoded ciphertext to obtain the ciphertext.

According to the secure repeater based quantum communication method provided by the present application, on the basis of the above, the encoding, by the transmitter, the first encoded ciphertext to the single photons and transmitting, by the transmitter, the single photons to the first repeater node connected to the transmitter includes:
performing a first transmission operation cyclically until all the first encoded ciphertext is transmitted to the first repeater node;
where the first transmission operation includes:
obtaining, by the transmitter, a first eavesdropping detection bit error rate, the first eavesdropping detection bit error rate representing a security in quantum communication between the transmitter and the first repeater node;
in case that the first eavesdropping detection bit error rate is less than a first security threshold, transmitting a first single photon encoded based on the first encoded ciphertext to the first repeater node; and
obtaining, by the first repeater node, the first encoded ciphertext based on the first single photon.

According to the secure repeater based quantum communication method provided by the present application, on the basis of the above, before the obtaining, by the transmitter, the first eavesdropping detection bit error rate, the method further includes:
  preparing, by the first repeater node, single photons as first transmission photons randomly using a basis vector and transmitting, by the first repeater node, the first transmission photons to the transmitter;
  selecting, by the transmitter, some of the first transmission photons transmitted from the first repeater node for measurement randomly and publishing, by the transmitter, first measurement information through classical communication, where the first measurement information includes positions of the first transmission photons measured by the transmitter, a basis vector for measurement and a measurement result; and
  determining, by the first repeater node, the first eavesdropping detection bit error rate based on the first measurement information and information of the first transmission photons that have been transmitted from the first repeater node and publishing, by the first repeater node, the first eavesdropping detection bit error rate through classical communication.

According to the secure repeater based quantum communication method provided by the present application, on the basis of the above, the method further includes:
  determining a first wiretap channel capacity between the transmitter and the first repeater node based on the first eavesdropping detection bit error rate;
  determining a first main channel capacity between the transmitter and the first repeater node based on a reception rate for the first transmission photons by the first repeater node and a first quantum bit error rate detected during transmitting the first encoded ciphertext; and
  adjusting an encoding efficiency of the transmitter to encode the first encoded ciphertext to the first single photon based on the first main channel capacity and the first wiretap channel capacity.

According to the secure repeater based quantum communication method provided by the present application, on the basis of the above, the encoding, by the current repeater node, the second encoded ciphertext to the single photons and transmitting, by the current repeater node, the single photons to the next repeater node or the receiver connected to the current repeater node includes:
  performing a second transmission operation cyclically until all the second encoded ciphertext is transmitted to the next repeater node or the receiver;
  where the second transmission operation includes:
  obtaining, by the current repeater node, a second eavesdropping detection bit error rate, the second eavesdropping detection bit error rate representing a security in quantum communication between the current repeater node and the next repeater node or between the current repeater node and the receiver;
  in case that the second eavesdropping detection bit error rate is less than a second security threshold, transmitting a second single photon encoded based on the second encoded ciphertext to the next repeater node or the receiver; and
  obtaining, by the next repeater node or the receiver, the second encoded ciphertext based on the second single photon.

According to the secure repeater based quantum communication method provided by the present application, on the basis of the above, before the obtaining, by the current repeater node, the second eavesdropping detection bit error rate, the method further including:
  preparing, by the next repeater node or the receiver, single photons as second transmission photons randomly using a basis vector and transmitting, by the next repeater node or the receiver, the second transmission photons to the current repeater node;
  measuring, by the current repeater node, the second transmission photons transmitted from the next repeater node or the receiver and publishing, by the current repeater node, second measurement information through classical communication, where the second measurement information includes a position of the second transmission photons measured by the current repeater node, a basis vector for measurement and a measurement result; and
  determining, by the next repeater node or the receiver, the second eavesdropping detection bit error rate based on the second measurement information and information of the second transmission photons and publishing, by the next repeater node or the receiver, the second eavesdropping detection bit error rate through classical communication.

According to the secure repeater based quantum communication method provided by the present application, on the basis of the above, the method further includes:
  determining a second wiretap channel capacity between the current repeater node and the next repeater node or between the current repeater node and the receiver based on the second eavesdropping detection bit error rate;
  determining a second main channel capacity between the current repeater node and the next repeater node or between the current repeater node and the receiver based on a reception rate for the second transmission photons by the current repeater node and a second quantum bit error rate detected during transmitting the second encoded ciphertext; and
  adjusting an encoding efficiency of the current repeater node to encode the second encoded ciphertext to the second single photon based on the second main channel capacity and the second wiretap channel capacity.

According to the secure repeater based quantum communication method provided by the present application, on the basis of the above, the receiving and decrypting, by the receiver, the ciphertext to obtain the plaintext information includes:
  generating, by the transmitter and the receiver, an encryption key and a decryption key through a classical encryption algorithm; and
  decrypting, by the receiver, the ciphertext using the decryption key to obtain the plaintext information.

The present application provides a secure repeater based quantum communication network, including a transmitter, at least one repeater node and a receiver, where the transmitter, the at least one repeater node and the receiver communicate with each other based on any one of the above secure repeater based quantum communication methods.

The present application provides a secure repeater based quantum communication method and a communication network, in which the transmitter encrypts the plaintext information to be transmitted to obtain the ciphertext, the transmitter transmits the ciphertext to the repeater node through the quantum communication protocol and the ciphertext is transmitted to the receiver through the at least one repeater node, and the receiver receives the ciphertext and decrypts the ciphertext to obtain the plaintext information. By transmitting the ciphertext through at least one repeater node step-by-step, without being limited to the distance between the transmitter and receiver, the ciphertext can be transmitted over a long distance. At the same time, before arriving at the receiver, the plaintext information is transmitted in the form of ciphertext using an on-the-fly decryption, which reduces the risk of information being eavesdropped and improves security.

BRIEF DESCRIPTION OF THE DRAWINGS

In order to clearly illustrate solutions according to the present application or the related art, the drawings used in the descriptions of the embodiments or the related art are briefly described below. The drawings in the following description are only certain embodiments of the present application, and other drawings may be obtained according to the drawings without creative work for those skilled in the related art.

DETAILED DESCRIPTION

In order to make the objectives, solutions and advantages of the present application clearer, the solutions according to the present application are clearly and completely described in the following with reference to the accompanying drawings of the present application. The described embodiments are only a part of the embodiments of the present application, and not all of the embodiments. All other embodiments obtained by a person of ordinary skill in the art based on the embodiments of the present application without creative work are within the scope of the present application.

In order to implement long-distance quantum communication, such as global quantum communication, a relay, i.e. a repeater node, is used in the present application. Nowadays, technologies of quantum repeater and quantum storage are not mature, and a quantum communication network built based on quantum key distribution adopts a classical "trusted relay" scheme. However, there is a certain premise for the security of this scheme, that is, all repeater nodes in the network should be trusted. It is difficult to meet this premise in practical operation, and once an eavesdropper attacks a trusted node and wiretaps the key, the security of the communication network is damaged. Since random numbers are randomly generated during the transmission process of QKD, and are subjected to scrambling and secret amplification processing as post processing, the key to be agreed cannot be encrypted using classical encryption methods and transmitted. Therefore, quantum communication networks based on trusted relay require a large amount of manpower and material resources to ensure the security of trusted nodes, but there are many uncontrollable factors that may result in a leakage, which are not conducive to large-scale promotion and application.

In response to the problem of bottleneck for communication distance caused by link losses in point-to-point quantum communication, in the present application, several nodes, i.e. repeater nodes, are established between two communication users with a long distance, and a long-distance quantum communication and multi-user network communication are implemented based on a step-by-step transmission of secret messages between nodes. Regarding to the problem of that the security of the traditional quantum network communication requires that the repeater nodes are trustworthy, the present application proposes a secure repeater communication method based on a combination of quantum secure direct communication and a classical cipher. In a trusted relay network based on quantum key distribution, the keys need to load at each node, leaving eavesdroppers with conditions for eavesdropping and resulting in large hidden safety hazards. In the secure repeater network, a classical cipher is employed to protect information at repeater nodes, which has computational security, eliminates problems above, and provides a solution for the large-scale application of quantum networks.

Figure 1:
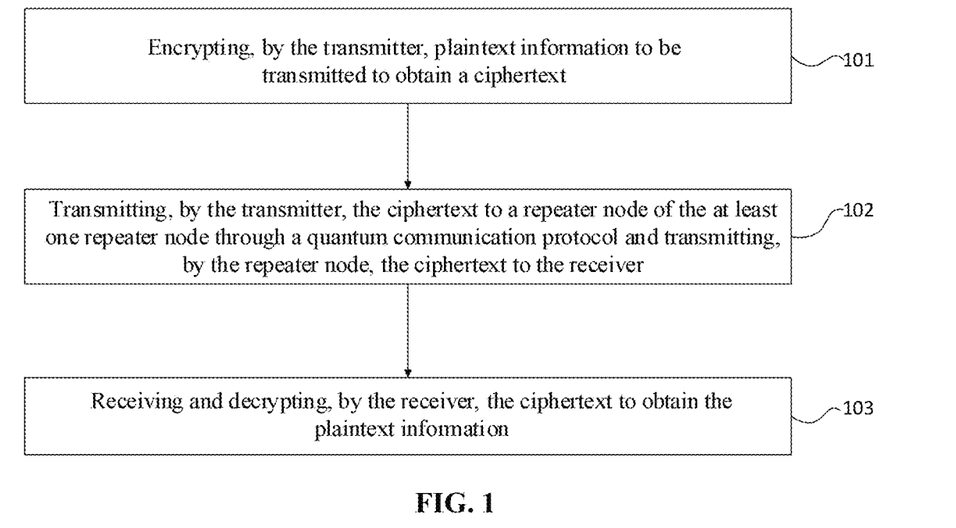
FIG. 1 is a schematic flowchart of a secure repeater based quantum communication method according to the present application.

FIG. 1 is a schematic flowchart of a secure repeater based quantum communication method according to an embodiment of the present application. With a reference of the FIG. 1, the secure repeater based quantum communication method is applied to a communication network, and the communication network includes a transmitter, at least one repeater node and a receiver. The method includes:

step 101: encrypting, by the transmitter, plaintext information to be transmitted to obtain a ciphertext;

step 102: transmitting, by the transmitter, the ciphertext to a repeater node of the at least one repeater node through a quantum communication protocol and transmitting, by the repeater node, the ciphertext to the receiver; and step 103: receiving and decrypting, by the receiver, the ciphertext to obtain the plaintext information;

where a distance between the transmitter and the repeater node for transmitting the ciphertext, a distance between two repeater nodes of the at least one repeater node for transmitting the ciphertext, and a distance between the repeater node for transmitting the ciphertext and the receiver are less than or equal to a maximum communication distance of quantum communication.

In an embodiment, modes for encrypting the plaintext information used by the transmitter include one-time pad, classical cipher and post quantum cryptography, etc.

In an embodiment, the quantum communication protocol may include DL04 quantum direct communication protocol, two-step quantum direct communication protocol, high-dimension two-step quantum direct communication protocol, measurement device independent quantum direct communication protocol, device independent quantum direct communication protocol, unidirectional quantum direct communication, etc.

In an embodiment, the transmitter and receiver may transmit the ciphertext through one or more repeater nodes, and the transmission of the ciphertext between the transmitter and receiver is not limited by distance. In addition, the ciphertext is not decrypted into plaintext password at the repeater node, which ensures the security of the transmission of the ciphertext.

Figure 2:
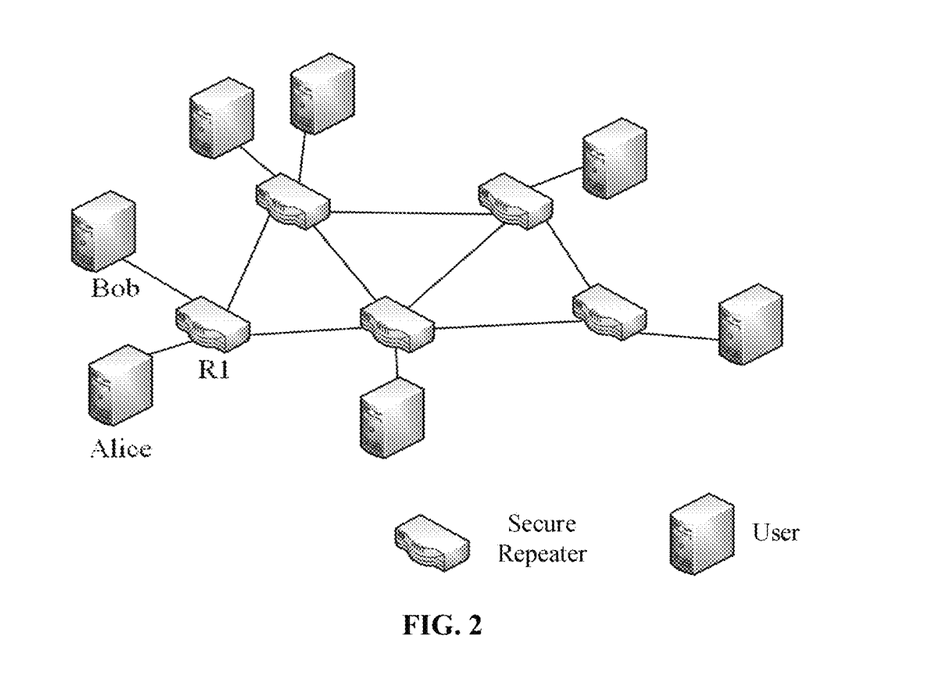
FIG. 2 is a schematic structural diagram of a secure repeater based quantum network according to the present application.

FIG. 2 is a schematic structural diagram of a secure repeater based quantum network according to an embodiment of the present application. The user nodes in the network, such as the transmitter Alice and the receiver Bob, are connected through a repeater node, i.e. a secure repeater in FIG. 2, which makes that the transmitter and the receiver communicate without considering distance restriction. As shown in FIG. 2, a secure repeater based quantum direct communication network includes multiple network nodes, namely legitimate communication users and secure repeater nodes. The two users Alice and Bob with a distance of L cannot establish direct communication due to their long distance. With the help of secure repeater node R1, the communication distance can be divided into two segments. Assuming that the distances of the two segments are 112 and 112 is a communication distance that may implement quantum direct communication, i.e. the maximum communication distance, the information transmitter Alice can transmit a secret message to the secure repeater node R1, and then the R1 transmits the secret message to the information receiver Bob, thus achieving long-distance quantum communication. At the same time, the secure repeater node has routing function. The secure repeater node is connected to other secure repeater nodes and neighboring communication users in the network, forming a multi-user quantum direct communication network in which quantum direct communication can be achieved between any two legitimate users.

The embodiments of the present application provide a secure repeater based quantum communication method, in which the transmitter encrypts the plaintext information to be transmitted to obtain the ciphertext, the transmitter transmits the ciphertext to the repeater node through the quantum communication protocol and the ciphertext is transmitted to the receiver through the at least one repeater node, and after receiving the ciphertext, the receiver decrypts the ciphertext to obtain the plaintext information. By transmitting the ciphertext through at least one repeater nodes step-by-step, without being limited to the distance between the transmitter and receiver, the ciphertext may be transmitted over a long distance. At the same time, before arriving at the receiver, the plaintext information is transmitted in the form of ciphertext using on-the-fly decryption, which reduces the risk of information being eavesdropped and improves security.

In an embodiment, on the basis of the above embodiments, the transmitting, by the transmitter, the ciphertext to the repeater node of the at least one repeater node through the quantum communication protocol and transmitting, by the repeater node, the ciphertext to the receiver includes:

performing multiple rounds of encoded ciphertext transmission operation until the ciphertext is transmitted to the receiver;

where the encoded ciphertext transmission operation includes:

in case of performing a first round of encoded ciphertext transmission operation, encrypting, by the transmitter, the ciphertext using a key in a local first key pool to obtain a first encoded ciphertext, encoding, by the transmitter, the first encoded ciphertext to single photons and transmitting, by the transmitter, the single photons to a first repeater node connected to the transmitter, and decrypting, by the first repeater node, the first encoded ciphertext to obtain the ciphertext; or in case of performing a non-first round of encoded ciphertext transmission operation, encrypting, by a current repeater node which obtains the ciphertext through decryption, the ciphertext using a key in a local second key pool to obtain a second encoded ciphertext, encoding, by the current repeater node, the second encoded ciphertext to single photons and transmitting, by the current repeater node, the single photons to a next repeater node or the receiver connected to the current repeater node, and decrypting, by the next repeater node or the receiver, the second encoded ciphertext to obtain the ciphertext.

In each round of encoded ciphertext transmission operation, the ciphertext is transmitted to the next node. For example, in case that the first round of encoded ciphertext transmission operation is performed, the ciphertext is transmitted from the transmitter to the first repeater node. The subsequent process of transmitting the ciphertext from the current repeater node to the next repeater node, as well as the process of transmitting the ciphertext from the repeater node to the receiver is called a round of encoded ciphertext transmission operation. In each round of encoded ciphertext transmission operation, the encoded ciphertext is transmitted to the next node in the form of being encoded to the single photon, where the encoded ciphertext is obtained by encoding the ciphertext.

In this embodiment, the plaintext information is securely transmitted to the receiver in a quantum communication manner through multiple rounds of encoded ciphertext transmission operations, without being limited to the distance between the transmitter and the receiver.

Taking an example of only one repeater node R1 between the transmitter and the receiver, the plaintext information is transmitted by the following process:

the transmitter Alice selects an encryption method to encrypt the plaintext information to be transmitted, and then selects a quantum communication protocol to transmit the ciphertext to the secure repeater node, i.e. repeater node R1, through a quantum channel;

after receiving a quantum state carrying ciphertext information, the secure repeater node R1 demodulates the quantum state to obtain the ciphertext information, where the ciphertext is encoded using classical error correcting code and transmitted, and the bit error rate is estimated based on error syndromes to evaluate the eavesdropped occasions during the transmission of the ciphertext. In case that the eavesdropping is within an allowable range, for example, the bit error rate is less than a certain threshold, the secure repeater node transmits the obtained ciphertext to the next node using the quantum secure direct communication protocol, and the process is continued until the ciphertext is transmitted to the receiver Bob.

After obtaining the ciphertext information, Bob decrypts the ciphertext using a decryption method corresponding to the encryption method used by Alice to obtain the plaintext.

It can be seen that in such secure repeater schemes, the information is transmitted in an on-the-fly manner at repeater nodes. Even if the eavesdroppers attack a certain node, they obtain the ciphertext and cannot obtain valid plaintext information. The transmitted information is secure at each repeater nodes in the quantum communication network, and repeater nodes no longer require to be trusted. The ciphertext is transmitted in the quantum channel, and the communication users Alice and Bob extract the key for quantum secure direct communication without quantum storage from the ciphertext. The transmission process has the capability to detect eavesdropping.

In an embodiment, each user and repeater nodes in the quantum direct communication network is equipped with a receiving module and a communication module for quantum secure direct communication. In an embodiment, the transmitted information may be packeted using a packet switching method for a classical network based on a certain size, and the transmission route for the packeted transmitted information may be freely selected. In the present application, the original classical communication is replaced with quantum secure direct communication to eliminate information leakage during transmission. At repeater nodes, information is protected by classical cipher, and all other technologies of classical networks can be used. In an embodiment, the present application can be used to transmit identity authentication information of legitimate communication parties to complete identity authentication.

Further, on the basis of the above embodiments, the encoding, by the transmitter, the first encoded ciphertext to the single photons and transmitting, by the transmitter, the single photons to the first repeater node connected to the transmitter includes:

performing a first transmission operation cyclically until all the first encoded ciphertext is transmitted to the first repeater node;

where the first transmission operation includes:

obtaining, by the transmitter, a first eavesdropping detection bit error rate, the first eavesdropping detection bit error rate representing a security in quantum communication between the transmitter and the first repeater node;

in case that the first eavesdropping detection bit error rate is less than a first security threshold, transmitting a first single photon encoded based on the first encoded ciphertext to the first repeater node; and obtaining, by the first repeater node, the first encoded ciphertext based on the first single photon.

In an embodiment, in case that the first eavesdropping detection bit error rate is greater than the first security threshold, the communication is terminated, i.e. the transmitter does not transmit the first encoded ciphertext to the first repeater node.

The higher the first eavesdropping detection bit error rate, the greater the risk of being eavesdropped for the information transmitted from the transmitter to the first repeater node. Therefore, the first encoded ciphertext is transmitted to the first repeater node only in case that the first eavesdropping detection bit error rate is less than the first security threshold, which reduces the risk of being eavesdropped during the transmission process of the first encoded ciphertext.

In an embodiment, the first single photon to be transmitted is encoded based on the first encoded ciphertext includes:

in case of transmitting bit "0", the single photon is modulated using unitary operation $$\mathbb{I} = \begin{pmatrix} 1 & 0 \\ 0 & 1 \end{pmatrix};$$

and in case of transmitting bit "1", the single photon is modulated using unitary operation $$\mathbb{W} = \begin{pmatrix} 0 & 1 \\ -1 & 0 \end{pmatrix}.$$

The single photon loaded with codewords information is returned to R1.

In this embodiment, the first encoded ciphertext is transmitted to the first repeater node in the manner of quantum communication through the first transmission operation.

Further, on the basis of the above embodiments, before the obtaining, by the transmitter, the first eavesdropping detection bit error rate, the method includes:

preparing, by the first repeater node, single photons as first transmission photons randomly using a basis vector and transmitting, by the first repeater node, the first transmission photons to the transmitter;

selecting, by the transmitter, some of the first transmission photons transmitted from the first repeater node for measurement randomly and publishing, by the transmitter, first measurement information through classical communication, where the first measurement information includes positions of the first transmission photons measured by the transmitter, a basis vector for measurement and a measurement result; and determining, by the first repeater node, the first eavesdropping detection bit error rate based on the first measurement information and information of the first transmission photons that have been transmitted from the first repeater node and publishing, by the first repeater node, the first eavesdropping detection bit error rate through classical communication.

In an embodiment, the first repeater node compares the first measurement information with preparation information of photons that are randomly selected by the transmitter for eavesdropping detection measurement, and calculates the first eavesdropping detection bit error rate.

It should be noted that the bit error rate is used to characterize inconsistent measurement results obtained by the first repeater node and the transmitter selecting the same basis vector for measuring a single photon. This inconsistency (bit error) is caused by a scrambling of eavesdropping behavior on quantum state, and eavesdropping can be detected through detecting the real-time bit error rate. The calculation for the first eavesdropping detection bit error rate is performed before the ciphertext information is encoded. In case that the first eavesdropping detection bit error rate is greater than the security threshold, the transmitter may terminate the information encoding process. As such, the transmitter determines whether an eavesdropper is eavesdropping on the quantum channel before transmitting the secret information. On the other hand, the ciphertext is directly transmitted over the quantum channel, even if the ciphertext is intercepted, the eavesdropper cannot decrypt the ciphertext. As such, eavesdropping can be prevented and avoided.

In this embodiment, the calculation for the first eavesdropping detection bit error rate is implemented, and the first encoded ciphertext is transmitted in case that the first eavesdropping detection bit error rate is lower than the first security threshold, which ensures the communication security.

Further, on the basis of the above embodiments, the method includes: determining a first wiretap channel capacity between the transmitter and the first repeater node based on the first eavesdropping detection bit error rate;

determining a first main channel capacity between the transmitter and the first repeater node based on a reception rate for the first transmission photons by the first repeater node and a first quantum bit error rate detected during transmitting the first encoded ciphertext; and adjusting an encoding efficiency of the transmitter to encode the first encoded ciphertext to the first single photon based on the first main channel capacity and the first wiretap channel capacity.

In an embodiment, the reception rate for the first transmission photons refers to a reception rate of the first transmission photons received by the first repeater node relative to the first transmission photons transmitted from the first repeater node to the transmitter after the first repeater node transmits the first transmission photons to the transmitter and the transmitter transmits the first transmission photons to the first repeater node. For example, the first repeater node determines the reception rate for the first transmission photons based on information of the first transmission photons and photons ultimately received by the transmitter.

In an embodiment, the first quantum bit error rate is determined by publishing, by the transmitter, code words of some transmitted first encoded ciphertext, and comparing, by the first repeater node, the published code words of the first encoded ciphertext with the code words of corresponding first encoded ciphertext that has been received by the first repeater node, and then calculating the first quantum bit error rate.

In an embodiment, the wiretap channel capacity $C_{w1}$ is determined based on the formula $C_{w1}=Q_1^{Eve} \cdot h(2e_1)$, where $Q_1^{Eve}$ represents a reception rate of an eavesdropper, which is generally determined based on all link losses from repeater node R1 to Eve, $e_1$ represents an eavesdropping detection bit error rate, and $h(x)=-x \log_2(x)-(1-x)\log_2(1-x)$ represents binary Shannon entropy. In case of calculating the first wiretap channel capacity, $Q_1^{Eve}$ in the formula represents a reception rate of eavesdropper between the transmitter and the first repeater node, and $e_1$ represents the first eavesdropping detection bit error rate between the transmitter and the first repeater node.

In an embodiment, the main channel capacity $C_{m1}$ is determined based on the formula $C_{m1}=Q_1^{R1} \cdot [1-h(E_1)]$, where $Q_1^{R1}$ represents a reception rate of R1, $E_1$ represents a quantum bit error rate for ciphertext information transmission. In case of calculating the first main channel capacity, $Q_1^{R1}$ represents a reception rate of the first repeater node, and $E_1$ represents a quantum bit error rate for information transmission in case that the transmitter transmits the first encoded ciphertext to the first repeater node.

In general, the higher the first wiretap channel capacity and the lower the first main channel capacity, the lower the encoding efficiency for encoding the first encoded ciphertext to the first single photon.

In this embodiment, the risk of being eavesdropped is reduced by adjusting the encoding efficiency, which further improves the security of information transmission.

Further, on the basis of the above embodiments, the encoding, by the current repeater node, the second encoded ciphertext to the single photons and transmitting, by the current repeater node, the single photons to the next repeater node or the receiver connected to the current repeater node includes:
performing a second transmission operation cyclically until all the second encoded ciphertext is transmitted to the next repeater node or the receiver;
where the second transmission operation includes:
obtaining, by the current repeater node, a second eavesdropping detection bit error rate, the second eavesdropping detection bit error rate representing a security in quantum communication between the current repeater node and the next repeater node or between the current repeater node and the receiver;
in case that the second eavesdropping detection bit error rate is less than a second security threshold, transmitting a second single photon encoded based on the second encoded ciphertext to the next repeater node or the receiver; and
obtaining, by the next repeater node or the receiver, the second encoded ciphertext based on the second single photon.

In an embodiment, in case that the second eavesdropping detection bit error rate is greater than the second security threshold, the communication is terminated, i.e. the current repeater node does not transmit the second encoded ciphertext to the next repeater node or the receiver.

The higher the second eavesdropping detection bit error rate, the greater the risk of being eavesdropped for the information transmitted from the current repeater node to the next repeater node or the receiver. Therefore, the second encoded ciphertext is transmitted to the next repeater node or the receiver only in case that the second eavesdropping detection bit error rate is less than the second security threshold, which reduces the risk of being eavesdropped during the transmission process of the second encoded ciphertext.

In an embodiment, the second single photon to be transmitted is encoded based on the second encoded ciphertext includes:
in case of transmitting bit "0", the single photon is modulated using unitary operation $$\mathbb{I} = \begin{pmatrix} 1 & 0 \\ 0 & 1 \end{pmatrix};$$

and in case of transmitting bit "1", the single photon is modulated using unitary operation $$\mathbb{W} = \begin{pmatrix} 0 & 1 \\ -1 & 0 \end{pmatrix}.$$

The single photon loaded with codewords information is returned to the next repeater node or the receiver.

In this embodiment, the second encoded ciphertext is transmitted to the next repeater node or the receiver in the manner of quantum communication through the second transmission operation.

Further, on the basis of the above embodiments, before the obtaining, by the current repeater node, the second eavesdropping detection bit error rate, the method includes:
preparing, by the next repeater node or the receiver, single photons as second transmission photons randomly using a basis vector and transmitting, by the next repeater node or the receiver, the second transmission photon to the current repeater node;
measuring, by the current repeater node, the second transmission photons transmitted from the next repeater node or the receiver and publishing, by the current repeater node, second measurement information through classical communication, where the second measurement information comprises a position of the second transmission photons measured by the current repeater node, a basis vector for measurement and a measurement result; and
determining, by the next repeater node or the receiver, the second eavesdropping detection bit error rate based on the second measurement information and information of the second transmission photons and publishing, by the next repeater node or the receiver, the second eavesdropping detection bit error rate through classical communication.

In an embodiment, the next repeater node or the receiver compares the second measurement information with preparation information of photons that are randomly selected by the current repeater node for eavesdropping detection measurement, and calculates the second eavesdropping detection bit error rate.

The calculation for the second eavesdropping detection bit error rate is performed before the ciphertext information is encoded. In case that the second eavesdropping detection bit error rate is greater than the security threshold, the current repeater node may terminate the information encoding process. As such, the current repeater node determines whether an eavesdropper is eavesdropping on the quantum channel before transmitting the secret information. On the other hand, the ciphertext is directly transmitted over the quantum channel, even if the ciphertext is intercepted, the eavesdropper cannot decrypt the ciphertext. As such, eavesdropping can be prevented and avoided.

In this embodiment, the calculation for the second eavesdropping detection bit error rate is implemented, and the second encoded ciphertext is transmitted in case that the second eavesdropping detection bit error rate is lower than the second security threshold, which ensures the communication security.

Further, on the basis of the above embodiments, the method includes:
  determining a second wiretap channel capacity between the current repeater node and the next repeater node or between the current repeater node and the receiver based on the second eavesdropping detection bit error rate;
  determining a second main channel capacity between the current repeater node and the next repeater node or between the current repeater node and the receiver based on a reception rate for the second transmission photons by the current repeater node and a second quantum bit error rate detected during transmitting the second encoded ciphertext; and
  adjusting an encoding efficiency of the current repeater node to encode the second encoded ciphertext to the second single photon based on the second main channel capacity and the second wiretap channel capacity.

In an embodiment, the reception rate for the second transmission photon refers to a reception rate of the second transmission photons received by the next repeater node or the receiver relative to the second transmission photons transmitted from the next repeater node or the receiver to the current repeater node after the next repeater node or the receiver transmits the second transmission photons to the current repeater node and the current repeater node transmits the second transmission photons to the next repeater node or the receiver. For example, the next repeater node or the receiver determines the reception rate for the second transmission photon based on information of the second transmission photons and photons ultimately received by the next repeater node or the receiver.

In an embodiment, the second quantum bit error rate is determined by: publishing, by the current repeater node, code words of some transmitted second encoded ciphertext, and comparing, by the next repeater node or the receiver, the published code words of the second encoded ciphertext with the code words of corresponding second encoded ciphertext that has been received by the next repeater node or the receiver, and then calculating the second quantum bit error rate.

In an embodiment, for the formula $C_{w1}=Q_1^{Eve} \cdot h(2e_1)$, in case of calculating the second wiretap channel capacity, $Q_1^{Eve}$ represents a reception rate of eavesdropper between the current repeater node and the next repeater node or between the current repeater node and the receiver, and $e_1$ represents the second eavesdropping detection bit error rate between the current repeater node and the next repeater node or between the current repeater node and the receiver.

In an embodiment, for the formula $C_{m1}=Q_1^{R1} \cdot [1-h(E_1)]$, in case of calculating the second main channel capacity, $Q_1^{R1}$ represents a reception rate of the next repeater node or the receiver, and $E_1$ represents a quantum bit error rate for information transmission in case that the current repeater node transmits the second encoded ciphertext to the next repeater node or the receiver.

In general, the higher the second wiretap channel capacity and the lower the second main channel capacity, the lower the encoding efficiency for encoding the second encoded ciphertext to the second single photon.

In this embodiment, the risk of being eavesdropped is reduced by adjusting the encoding efficiency, which further improves the security of information transmission.

Further, on the basis of the above embodiments, the receiving and decrypting, by the receiver, the ciphertext to obtain the plaintext information includes:
  generating, by the transmitter and the receiver, an encryption key and a decryption key through a classical encryption algorithm; and
  decrypting, by the receiver, the ciphertext using the decryption key to obtain the plaintext information.

In the process of quantum communication, the ciphertext is not decrypted into plaintext information, which ensures the security of the information.

Figure 3:
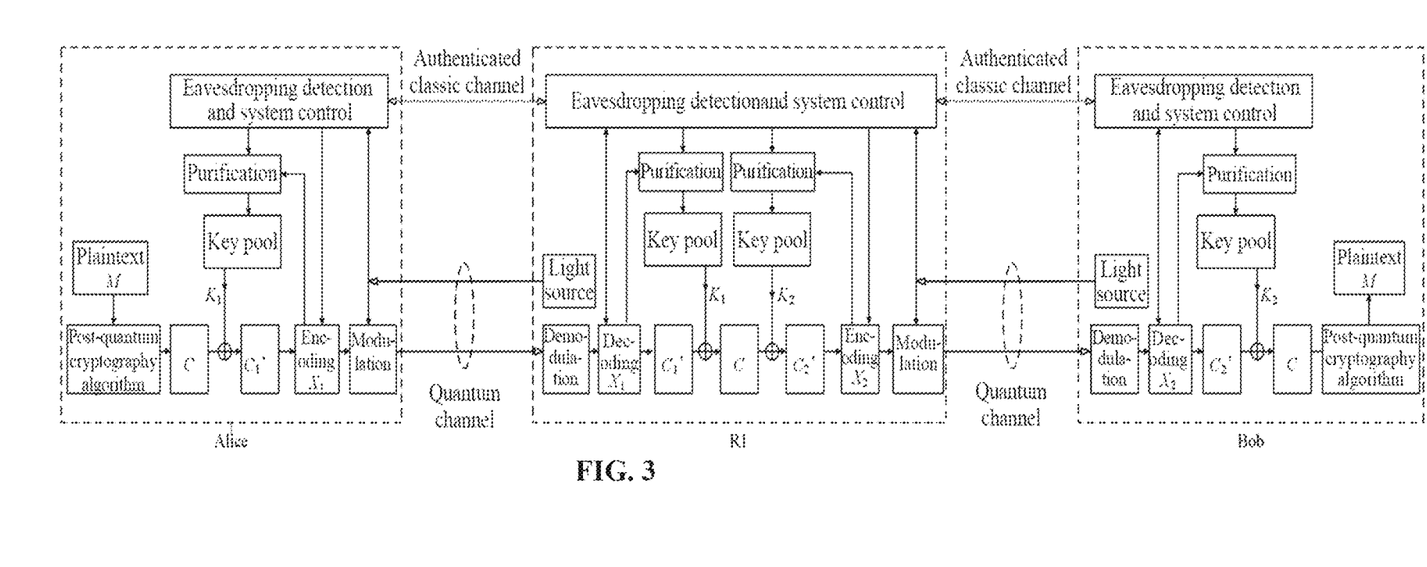
FIG. 3 is a schematic diagram of a system in which users conduct quantum secure direct communication based on a secure repeater according to the present application.

FIG. 3 is a schematic diagram of a system in which users conduct quantum secure direct communication based on a secure repeater according to an embodiment of the present application. Taking the communication between Alice and Bob via secure repeater node R1 in FIG. 2 as an example, where DL04 protocol is used to achieve a point-to-point quantum secure direct communication and a post-quantum cryptography algorithm is used for encryption, the secure repeater based quantum direct communication system includes an eavesdropping detection module, a system control module, a key purification module, a key pool, an encryption module, a decryption module, an encoding module, a decoding module, a modulation module, a demodulation module, and a light source. With a reference of FIG. 3, the communication process includes the following steps.

1) Quantum Secure Direct Communication from Alice to R1
  Step 1: Alice encrypts the plaintext information M to be transmitted to Bob into ciphertext C using an encryption method of the post-quantum cryptography algorithm. Alice then encrypts C using key $K_1$ to obtain $C_1'$, $C_1'=C \oplus K_1$ the key $K_1$ is from the key pool and has the same length as ciphertext C. The step 1 is used to implement quantum direct communication without quantum storage. In case that the key pool does not contain a sufficiently long key sequence, Alice first transmits a random number sequence.
  Step 2: The secure repeater node R1 randomly uses basis vector $\mathbb{Z}: \{|0\rangle, |1\rangle\}$ or $\mathbb{X}: \{|+\rangle, |-\rangle\}$ to prepare the single photons and transmits the single photons to Alice. These single photons are in one of the following four quantum states: $\{|0\rangle, |1\rangle, |+\rangle, |-\rangle\}$.
  Step 3: After receiving the single photons transmitted from R1, Alice randomly chooses to perform eavesdropping detection or encoding. In case of performing eavesdropping detection, a demodulation method used by Alice is to randomly select a basis vector $\mathbb{Z}$ or $\mathbb{X}$ to measure the single photons, and then Alice publishes the positions of the single photons on which eavesdropping detection is performed, basis vector for measurement and measurement results through an authenticated classical channel. R1 compares its basis vector information for preparation with the information published by Alice to count the detection bit error rate $e_1$, and estimates the wiretap channel capacity using $C_{w1}=Q_1^{Eve}h(2e_1)$, where $Q_1^{Eve}$ represents a reception rate of eavesdropper. R1 informs Alice of $e_1$ and $C_{w1}$ over a classical channel. In case that $e_1$ is less than the safety threshold, the next step is performed, otherwise, the communication is terminated.

Step 4: In case of performing encoding, Alice chooses an encoding technique to encode the ciphertext $C_1'$ obtained in step 1 into code word $X_1$, and then modulates the single photons based on a frame of code word to be transmitted. In case of transmitting bit "0", the single photon is modulated using unitary operation $$\mathbb{I} = \begin{pmatrix} 1 & 0 \\ 0 & 1 \end{pmatrix};$$

and in case of transmitting bit "1", the single photon is modulated using unitary operation $$\mathbb{Y} = \begin{pmatrix} 0 & 1 \\ -1 & 0 \end{pmatrix}.$$

The single photon after loading the code word information is returned to R1.

Step 5: R1 demodulates the single photon returned by Alice to obtain the transmitted code word, R1 and Alice count the quantum bit error rate $E_1$ and then calculate the main channel capacity $C_{m1}=Q_1^{R1}\cdot[1-h(E_1)]$ and the security channel capacity $C_{s1}=\max\{C_{m1}-C_{w1}, 0\}$, where $Q_1^{R1}$ represents the reception rate of R1. R1 uses a decoding technique corresponding to the encoding technique in step 3 to decode the code word into ciphertext $C_1'$ to obtain the ciphertext C, $C=C_1'\oplus K_1=C\oplus K_1\oplus K_1$. The encoding efficiency of the encoding technique in step 4 in the next round depends on the wiretap channel capacity and the main channel capacity. Alice and R1 extract a common key from code word $X_1$ for the next quantum direct communication transmission without quantum storage, where the length of the extracted key is determined by the security channel capacity $C_{s1}$.

Step 6: Steps 2 to 5 are repeated for several rounds until all ciphertext is transmitted to R1.

1) Quantum Secure Direct Communication from R1 to Bob

Step 7: R1 uses key $K_2$ to encrypt C to obtain $C_2'$, $C_2'=C\oplus K_2$.

Step 8: Bob randomly uses basis vector $\mathbb{Z}$: $\{|0\rangle, |1\rangle\}$ or $\mathbb{X}$: $\{|+\rangle, |-\rangle\}$ to prepare the single photons and transmits the single photons to R1. These single photons are in one of the following four quantum states: $\{|0\rangle, |1\rangle, |+\rangle, |-\rangle\}$.

Step 9: After receiving the single photons transmitted from Bob, R1 randomly chooses to perform eavesdropping detection or encoding. In case of performing eavesdropping detection, a demodulation method used by R1 is to randomly select a basis vector $\mathbb{Z}$ or $\mathbb{X}$ to measure the single photons, and then R1 publishes the positions of the single photons won which eavesdropping detection is performed, basis vector for measurement and measurement results through an authenticated classical channel. Bob compares his basis vector information for preparation with the information published by R1 to count the detection bit error rate $e_2$, and estimates the wiretap channel capacity $C_{w2}=Q_2^{Eve}\cdot h(2e_2)$, where $Q_2^{Eve}$ represents a reception rate of eavesdropper. Bob informs R1 of $e_2$ and $C_{w2}$ over a classical channel. In case that $e_2$ is less than the safety threshold, the next step is performed, otherwise, the communication is terminated.

Step 10: In case of performing encoding, R1 chooses an encoding technique to encode the ciphertext $C_2'$ obtained in step 7 into code word $X_2$, and then modulates the single photons based on a frame of code word to be transmitted. In case of transmitting bit "0", the single photon is modulated using unitary operation $$\mathbb{I} = \begin{pmatrix} 1 & 0 \\ 0 & 1 \end{pmatrix};$$

and in case of transmitting bit "1", the single photon is modulated using unitary operation $$\mathbb{Y} = \begin{pmatrix} 0 & 1 \\ -1 & 0 \end{pmatrix}.$$

The single photon after loading the code word information is returned to Bob.

Step 11: Bob demodulates the single photons returned by R1 to obtain the transmitted code word, Bob and R1 count the quantum bit error rate $E_2$ and then calculate the main channel capacity $C_{m2}=Q_2^{Bob}\cdot[1-h(E_2)]$ and the security channel capacity $C_{s2}=\max\{C_{m2}-C_{w2}, 0\}$. Bob uses a decoding technique corresponding to the encoding technique in step 10 to decode the code word into ciphertext $C_2'$ to obtain the ciphertext C, $C=C_2'\oplus K_2=C\oplus K_2\oplus K_2$. The encoding efficiency of the encoding technique in step 10 in the next round depends on the wiretap channel capacity and the main channel capacity. R1 and Bob extract a common key from code word $X_2$ for the next quantum direct communication transmission without quantum storage, where the length of the extracted key is determined by the security channel capacity $C_{s2}$.

Step 12: Steps 7 to 11 are repeated for several rounds until all ciphertext is transmitted to Bob.

Step 13: Bob decrypts the ciphertext using the post quantum cryptography algorithm to obtain the plaintext transmitted from Alice to him.

Alice and Bob use a generic hash function family to extract the key from the code word, i.e. encoded ciphertext, and store the key into the key pool for their next quantum secure direct communication without quantum storage. The key is extracted from the transmitted code word and the code word has a capability of eavesdropping perception based on the quantum secure direct communication transmission. Therefore, in case of no eavesdropping, the key in the key pool can be reused, which alleviates the pressure on key resources caused by one-time pad. The key length k that Alice and Bob can extract is determined by the security channel capacity in the secure repeater communication process, $k=x\cdot C_s^{min}$, where x is the length of the transmitted code word X, $C_s^{min}$ is the minimum value among the security channel capacities obtained in all communication processes.

In the solutions of the embodiments of the present application, the repeater nodes for the secure repeater communication network are not required to be trusted since eavesdroppers can only obtain ciphertext transmitted in the network communication at a certain node, which eliminates the security risk of key landing in the trusted relay network and improves the security of the quantum communication network. Therefore, it is called "secure repeater". Secure repeater increases the communication distance for quantum direct communication, enabling the quantum direct communication to have an ability of global networking. Compared with classical network communication, in a secure repeater quantum communication network, ciphertext is encoded in quantum states, enabling the transmission of secret information to have capabilities of eavesdropping perception and eavesdropping prevention, and the security capacity of the channel can be quantitatively estimated. The encryption method for ciphertext may be post-quantum cryptography or any other classical cryptography. The post-quantum cryptography can resist the threat of being deciphered by quantum computer. The combination of quantum secure direct communication and classical cryptography provides dual protection of quantum and classics for information. Quantum secure direct communication network is a full quantum network, which is compatible with quantum computer network and traditional internet. The present application has a high practicality and can be widely applied and promoted.

The present application provides a secure repeater based quantum communication network, including a transmitter, at least one repeater node and a receiver;
where the transmitter, the at least one repeater node and the receiver communicate with each other based on any one of the above secure repeater based quantum communication methods.

In the communication network provided by the present application, the transmitter encrypts the plaintext information to be transmitted to obtain the ciphertext, the transmitter transmits the ciphertext to the repeater node through the quantum communication protocol and the ciphertext is transmitted to the receiver through the at least one repeater node, and after receiving the ciphertext, the receiver decrypts the ciphertext to obtain the plaintext information. By transmitting the ciphertext through at least one repeater nodes step-by-step, without being limited to the distance between the transmitter and receiver, the ciphertext can be transmitted over a long distance. At the same time, before arriving at the receiver, the plaintext information is transmitted in the form of ciphertext using an on-the-fly decryption method, which reduces the risk of information being eavesdropped and improves security.

Finally, it should be noted that the above embodiments are only used to illustrate the solutions of the present application, not to limit the present application. Although the present application has been described in detail with reference to the aforementioned embodiments, ordinary skills in the art should understand that they can still modify the solutions recorded in the aforementioned embodiments or equivalently replace some of the features. And these modifications or replacements do not separate the essence of the corresponding solutions from the scope of the solutions of the various embodiments of the present application.

What is claimed is:

1. A secure repeater based quantum communication method, applied to a communication network comprising a transmitter, at least one repeater node and a receiver, the method comprising:
    encrypting, by the transmitter, plaintext information to be transmitted to obtain a ciphertext;
    transmitting, by the transmitter, the ciphertext to a repeater node of the at least one repeater node through a quantum communication protocol and transmitting, by the repeater node, the ciphertext to the receiver; and
    receiving and decrypting, by the receiver, the ciphertext to obtain the plaintext information;
    wherein the transmitting, by the transmitter, the ciphertext to the repeater node of the at least one repeater node through the quantum communication protocol and transmitting, by the repeater node, the ciphertext to the receiver comprises:
        performing multiple rounds of encoded ciphertext transmission operation until the ciphertext is transmitted to the receiver;
    wherein the encoded ciphertext transmission operation comprises:
        in case of performing a first round of encoded ciphertext transmission operation, encrypting, by the transmitter, the ciphertext using a key in a local first key pool to obtain a first encoded ciphertext, encoding, by the transmitter, the first encoded ciphertext to single photons and transmitting, by the transmitter, the single photons to a first repeater node connected to the transmitter, and decrypting, by the first repeater node, the first encoded ciphertext to obtain the ciphertext; or
        in case of performing a non-first round of encoded ciphertext transmission operation, encrypting, by a current repeater node which obtains the ciphertext through decryption, the ciphertext using a key in a local second key pool to obtain a second encoded ciphertext, encoding, by the current repeater node, the second encoded ciphertext to single photons and transmitting, by the current repeater node, the single photons to a next repeater node or the receiver connected to the current repeater node, and decrypting, by the next repeater node or the receiver, the second encoded ciphertext to obtain the ciphertext.

2. The method of claim 1, wherein the encoding, by the transmitter, the first encoded ciphertext to the single photons and transmitting, by the transmitter, the single photons to the first repeater node connected to the transmitter comprises:
    performing a first transmission operation cyclically until all the first encoded ciphertext is transmitted to the first repeater node;
    wherein the first transmission operation comprises:
    obtaining, by the transmitter, a first eavesdropping detection bit error rate, the first eavesdropping detection bit error rate representing a security in quantum communication between the transmitter and the first repeater node;
    in case that the first eavesdropping detection bit error rate is less than a first security threshold, transmitting a first single photon encoded based on the first encoded ciphertext to the first repeater node; and
    obtaining, by the first repeater node, the first encoded ciphertext based on the first single photon.

3. The method of claim 2, before the obtaining, by the transmitter, the first eavesdropping detection bit error rate, further comprising:
    preparing, by the first repeater node, single photons as first transmission photons randomly using a basis vector and transmitting, by the first repeater node, the first transmission photons to the transmitter;
    selecting, by the transmitter, some of the first transmission photons transmitted from the first repeater node for measurement randomly and publishing, by the transmitter, first measurement information through classical communication, wherein the first measurement information comprises positions of the first transmission photons measured by the transmitter, a basis vector for measurement and a measurement result; and determining, by the first repeater node, the first eavesdropping detection bit error rate based on the first measurement information and information of the first transmission photons that have been transmitted from the first repeater node and publishing, by the first repeater node, the first eavesdropping detection bit error rate through classical communication.

4. The method of claim 3, further comprising:

determining a first wiretap channel capacity between the transmitter and the first repeater node based on the first eavesdropping detection bit error rate;

determining a first main channel capacity between the transmitter and the first repeater node based on a reception rate for the first transmission photons by the first repeater node and a first quantum bit error rate detected during transmitting the first encoded ciphertext; and adjusting an encoding efficiency of the transmitter to encode the first encoded ciphertext to the first single photon based on the first main channel capacity and the first wiretap channel capacity.

5. The method of claim 1, wherein the encoding, by the current repeater node, the second encoded ciphertext to the single photons and transmitting, by the current repeater node, the single photons to the next repeater node or the receiver connected to the current repeater node comprises:

performing a second transmission operation cyclically until all the second encoded ciphertext is transmitted to the next repeater node or the receiver;

wherein the second transmission operation comprises:

obtaining, by the current repeater node, a second eavesdropping detection bit error rate, the second eavesdropping detection bit error rate representing a security in quantum communication between the current repeater node and the next repeater node or between the current repeater node and the receiver;

in case that the second eavesdropping detection bit error rate is less than a second security threshold, transmitting a second single photon encoded based on the second encoded ciphertext to the next repeater node or the receiver; and obtaining, by the next repeater node or the receiver, the second encoded ciphertext based on the second single photon.

6. The method of claim 5, before the obtaining, by the current repeater node, the second eavesdropping detection bit error rate, further comprising:

preparing, by the next repeater node or the receiver, single photons as second transmission photons randomly using a basis vector and transmitting, by the next repeater node or the receiver, the second transmission photons to the current repeater node;

measuring, by the current repeater node, the second transmission photons transmitted from the next repeater node or the receiver and publishing, by the current repeater node, second measurement information through classical communication, wherein the second measurement information comprises a position of the second transmission photons measured by the current repeater node, a basis vector for measurement and a measurement result; and determining, by the next repeater node or the receiver, the second eavesdropping detection bit error rate based on the second measurement information and information of the second transmission photons and publishing, by the next repeater node or the receiver, the second eavesdropping detection bit error rate through classical communication.

7. The method of claim 6, further comprising:

determining a second wiretap channel capacity between the current repeater node and the next repeater node or between the current repeater node and the receiver based on the second eavesdropping detection bit error rate;

determining a second main channel capacity between the current repeater node and the next repeater node or between the current repeater node and the receiver based on a reception rate for the second transmission photons by the current repeater node and a second quantum bit error rate detected during transmitting the second encoded ciphertext; and adjusting an encoding efficiency of the current repeater node to encode the second encoded ciphertext to the second single photon based on the second main channel capacity and the second wiretap channel capacity.

8. The method of claim 1, wherein the receiving and decrypting, by the receiver, the ciphertext to obtain the plaintext information comprises:

generating, by the transmitter and the receiver, an encryption key and a decryption key through a classical encryption algorithm; and decrypting, by the receiver, the ciphertext using the decryption key to obtain the plaintext information.

9. A secure repeater based quantum communication network, comprising a transmitter, at least one repeater node and a receiver, wherein the transmitter, the at least one repeater node and the receiver communicate with each other based on the secure repeater based quantum communication method of claim 1.

* * * * *